United States Patent [19]

Nakamura et al.

[11] Patent Number: 5,847,789

[45] Date of Patent: *Dec. 8, 1998

[54] REFLECTIVE TYPE LIQUID CRYSTAL DISPLAY DEVICE

[75] Inventors: Kozo Nakamura, Kashiba; Seiichi Mitsui; Naofumi Kimura, both of Nara; Tatsuo Uchida, Sendai; Hidehiro Seki, Hachinohe, all of Japan

[73] Assignee: Sharp Kabushiki Kaisha, Osaka, Japan

[*] Notice: The term of this patent shall not extend beyond the expiration date of Pat. No. 5,684,551.

[21] Appl. No.: 887,219

[22] Filed: Jul. 2, 1997

Related U.S. Application Data

[62] Division of Ser. No. 526,275, Sep. 11, 1995, Pat. No. 5,684,551, which is a continuation of Ser. No. 81,155, Jun. 25, 1993, abandoned.

[30] Foreign Application Priority Data

| Jun. 26, 1992 | [JP] | Japan | 4-169540 |
| Sep. 30, 1992 | [JP] | Japan | 4-261310 |

[51] Int. Cl.$^6$ .................................................. G02F 1/1335
[52] U.S. Cl. ........................... 349/99; 349/113; 349/117
[58] Field of Search ............................... 349/117, 49, 113

[56] References Cited

U.S. PATENT DOCUMENTS

| 4,266,859 | 5/1981 | Togashi | 349/177 |
| 4,431,272 | 2/1984 | Yazawa et al. | 349/113 |
| 4,456,336 | 6/1984 | Chung et al. | 349/160 |
| 4,519,678 | 5/1985 | Komatsubara et al. | 349/160 |
| 4,701,028 | 10/1987 | Clerc et al. | 349/98 |

(List continued on next page.)

FOREIGN PATENT DOCUMENTS

| 0467659 | 7/1985 | European Pat. Off. . |
| 0162775 | 5/1991 | European Pat. Off. . |
| 0470817 | 8/1991 | European Pat. Off. . |
| 5-48733 | 4/1980 | Japan . |
| 5-70817 | 5/1980 | Japan . |
| 57-00615 | 1/1982 | Japan | 359/70 |

(List continued on next page.)

OTHER PUBLICATIONS

"Liquid Crystal Device Handbook" compiled by Committee 142 of Japan Society for the Promotion of Science, 1989, pp. 329–346.
Halliday and Resnick, *Physics*, Part 2, 3rd Edition, (1978), pp. 994–1015, 1069–1086.
Patent Abstracts of Japan, vol. 6, No. 75 (P–114)(May 12, 1982), Abstract of JP 57–13422 (Jan. 23, 1982).

*Primary Examiner*—William L. Sikes
*Assistant Examiner*—Toan Ton

[57] ABSTRACT

A liquid crystal display device of high display quality and superior sharpness is presented. Large bumps and small bumps made of synthetic resin material are formed on a glass substrate. Covering these bumps and filling the recesses among the bumps, a smoothing film is formed. On the smoothing film, a reflective metal film made of metal material such as aluminum is formed. This reflective metal film is formed in plural rows in a longitudinal band form. On the glass substrate, the bumps, smoothing film, and reflective metal film are combined to compose a reflector. An orientation film is formed on the reflective metal film. By the electric field applied in the liquid crystal layer so as to be in the light shielding state when the retardation $\Delta n_1 d_1$ of the liquid crystal cell and the retardation $\Delta n_2 d_2$ of the substrate possessing optical phase compensating function satisfy $|\Delta n_1 d_1 - \Delta n_2 d_2|/\lambda = 0.25 + m/2 \pm 0.1$ (m=0, 1, 2, - - - ), and in the light transmitting state when satisfying $|\Delta n_1 d_1 - \Delta n_2 d_2|\lambda = m/2 \pm 0.1$ (m=0, 1, 2, - - - ), by crossing the director direction of the liquid crystal molecule of the liquid crystal cell and the slow direction of the substrate possessing optical phase compensating function almost orthogonally, the value of $|\Delta n_1 d_1 - \Delta n_2 d_2|/\lambda$ is varied, and these two states are used to present a display, and the absorption axis or transmission axis of the polarizer is set at 30° to 60° to the director direction of the liquid crystal molecule of the liquid crystal cell.

10 Claims, 9 Drawing Sheets

U.S. PATENT DOCUMENTS

| | | | |
|---|---|---|---|
| 4,844,569 | 7/1989 | Wada et al. | 349/117 |
| 4,952,029 | 8/1990 | Hayashi et al. | 349/76 |
| 4,991,940 | 2/1991 | Dalisa et al. | 349/113 |
| 5,126,868 | 6/1992 | Kizaki et al. | 349/76 |
| 5,139,340 | 8/1992 | Okumura | 349/99 |
| 5,175,638 | 12/1992 | Kanemoto et al. | 349/121 |
| 5,220,444 | 6/1993 | Mitsui et al. | 349/113 |
| 5,287,207 | 2/1994 | Mulkens et al. | 349/76 |
| 5,418,635 | 5/1995 | Mitsui et al. | 349/113 |
| 5,559,617 | 9/1996 | Mitsui et al. | 349/117 |
| 5,640,259 | 6/1997 | Sawayama et al. | 349/33 |
| 5,684,551 | 11/1997 | Nakamura et al. | 349/99 |

FOREIGN PATENT DOCUMENTS

| | | | |
|---|---|---|---|
| 2-079018 | 3/1990 | Japan | 359/73 |
| 2-197817 | 8/1990 | Japan | 359/73 |
| 2-310523 | 12/1990 | Japan . | |
| 4-97121 | 3/1992 | Japan . | |
| 4-118628 | 4/1992 | Japan . | |
| 4-267220 | 9/1992 | Japan | 359/70 |
| 4-322224 | 11/1992 | Japan | 359/73 |
| 2064805 | 6/1981 | United Kingdom | 359/70 |

Fig. 6(1)
(SHIELDING REFLECTED LIGHT)
Fig. 6(2)
(TRANSMITTING REFLECTED LIGHT)
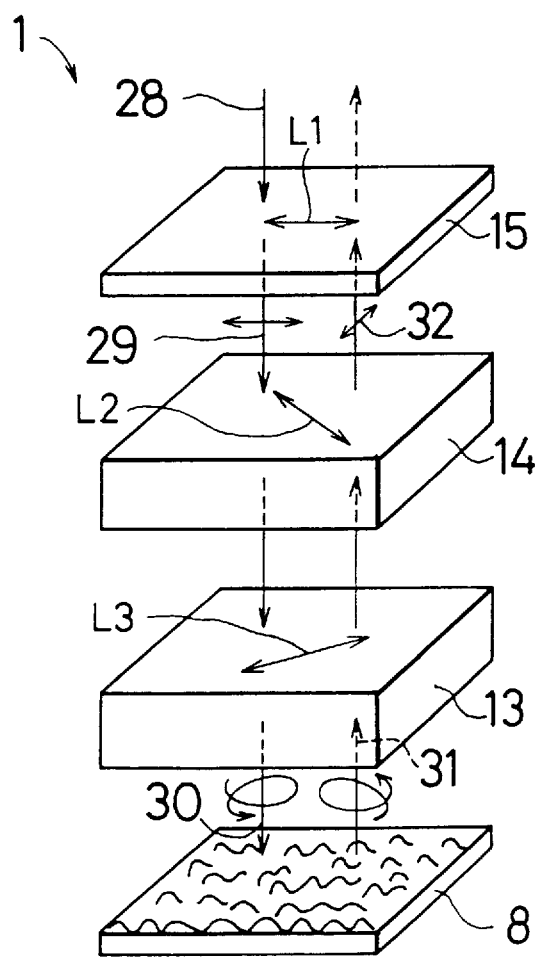
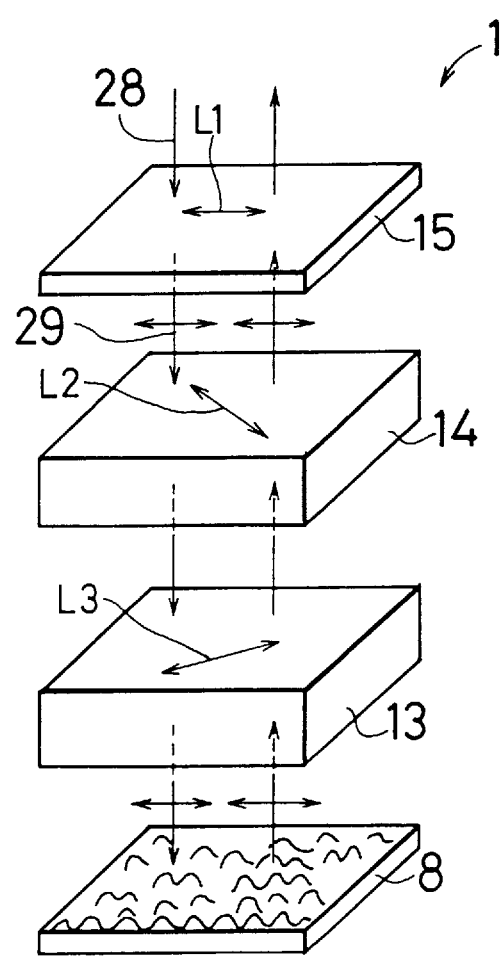

REFLECTIVE TYPE LIQUID CRYSTAL DISPLAY DEVICE

This application is a continuation divisional of application Ser. No. 08/526,275 filed on Sep. 11, 1995, now U.S. Pat. No. 5,684,551 the entire contents of which are hereby incorporated by reference; which was a continuation of application Ser. No. 08/081,155, filed on Jun. 25, 1993, now abandoned.

BACKGROUND OF THE INVENTION

1. Field of the Invention

The present invention relates to a reflective type liquid crystal display device of the direct viewing type, which does not use backlight. More particularly, it refers to a reflective type liquid crystal display device preferably used in office automation appliances such as word processor and so-called notebook type personal computer, video appliances, game machines, and the like.

2. Description of the Related Art

Recently, application of liquid crystal display devices have been rapidly promoted for use in the word processor, laptop personal computer, other office automation appliances, pocket-size television, and other video appliances, etc. Among these liquid crystal display devices, the reflective type liquid crystal display device for displaying by reflecting the light entering from the outside, is particularly noticed for the possibility of lower power consumption, thinner thickness and lighter weight because it does not require backlight as light source.

Hitherto, in the reflective type liquid crystal display device, the twisted nematic (TN) type and super-twisted nematic (STN) type have been employed.

In the TN type, a liquid crystal cell is disposed between a set of polarizers, and monochromatic (black and white) display is produced by making use of the optical characteristics of the liquid crystal cell, that is, the optical rotatory when no voltage is applied and the canceling of the optical rotatory when voltage is applied.

For color display, a back light is mounted on the back side, and color filters of red, blue and green, for example, are installed in the liquid crystal cell. Multicolor display of a relatively small number of colors is achieved by additive color mixture by utilizing the light switching characteristics of the liquid crystal cell with no-application/application of voltage, and full color display, capable of display any desired color in principle, is realized.

The drive system of such reflective type liquid crystal display devices is generally active matrix drive system or simple matrix drive system, which is employed in the display device of, for example, portable pocket-size liquid crystal television.

The display method widely employed in the display device for office automation appliances such as word processors is, for example, the STN type for setting the twist angle of the liquid crystal molecules in a range of 180° to 270°, in a liquid crystal display structure similar to the TN type.

It is a feature of this STN type that electro-optical characteristics possessing a sharp threshold value can be realized by increasing the twist angle of the liquid crystal molecules to more than 90°, optimizing the setting angle of the transmission axis of the polarizer to the elliptical polarization occurring due to the birefringence effect of the liquid crystal cell, and reflecting the sudden molecular orientation deformation accompanying application of voltage to the birefringence changes of the liquid crystal. It is therefore suited to the simple matrix drive system.

On the other hand, the shortcoming of this STN type is that the background color of the display is tinted with yellowish green or dark blue due to birefringence of the liquid crystal. As its improving measure, a new liquid crystal display device is proposed, in which color is compensated by overlapping the STN panel for display with a panel for optical compensation or a phase difference plate composed of a polycarbonate or other high polymer, so that display close to monochromatic display is realized.

At the present, the liquid crystal cell structure with such color compensation is distributed on the market as the paper-white type liquid crystal display device.

Incidentally, the detailed principle of operation of the TN type and STN type is described in the "Liquid Crystal Device Handbook" compiled by Committee 142 of Japan Society for the Promotion of Science, 1989, pp. 329–346.

To realize these liquid crystal cells of TN type or STN type as reflective type liquid crystal display devices, in a structure in which the liquid crystal cell is between a pair of polarizers, the reflector plate must be disposed at the outer side, owing to the restrictions of the principle of display method.

Accordingly, owing to the thickness of the glass substrate used in the liquid crystal display device, parallax is caused depending on the angle of the user observing the glass substrate, that is, the angle formed by the normal direction of the glass substrate and the direction of the user observing the liquid crystal display device, and the display is recognized as double images.

Or, if the method of controlling the birefringence of the liquid crystal by electric field and display by utilizing the light shutter function, such as the conventional TN type and STN type, is applied in the reflective type display device directly by a single polarizer, monochromatic display with contrast cannot be realized owing to its own principle.

A liquid crystal display device of reflective TN (45° twisted) type using one polarizer and a ¼ wavelength plate is disclosed in the Japanese Laid-open Patent Sho. 55-48733. In this device, using a 45° twisted liquid crystal layer, the plane of polarization is realized in two states, parallel to and 45° to the optical axis of the ¼ wavelength plate by controlling the applied electric field, and monochromatic display is achieved. The liquid crystal cell is composed of, sequentially from the incident light side, a polarizer, a 45° twisted liquid crystal cell, a ¼ wavelength plate, and a reflector.

Furthermore, the U.S. Pat. No. 4,701,028 (Clerc et al.) discloses a liquid crystal display device of a reflective type perpendicular orientation type combining one polarizer, a ¼ wavelength plate, and a perpendicular oriented liquid crystal cell.

The present applicants also filed a reflective type parallel orientation system by combining one polarizer, a parallel oriented liquid crystal cell, and a phase difference plate.

In the liquid crystal display device disclosed in the Japanese Laid-open Patent Sho. 55-48733, however, since it is necessary to install a ¼ wavelength plate between the liquid crystal layer and reflector, a reflective film cannot be composed, structurally, inside of the liquid crystal display device. In addition, the basic principle is the same as the TN type, and the steepness of the electro-optical characteristic is the same as in the TN type. Therefore, the contrast is low, and the steepness of the electro-optical characteristic is dull.

In the perpendicular oriented liquid crystal display device disclosed in the U.S. Pat. No. 4,701,028, (1) perpendicular orientation, in particular, slant perpendicular orientation is extremely difficult to control, and is not suited to mass production. (2) perpendicular orientation is weak in the orientation controlling force, and the response speed is slow, and (3) dynamic scattering may occur in perpendicular orientation when driving and hence the reliability is low, and other problems are known.

In the reflective type parallel orientation system, the display characteristic is inferior unless the setting angle of the director of the polarizer, phase difference plate, and liquid crystal molecule is appropriate, and coloring may occur due to wavelength dispersion of liquid crystal cell and phase difference plate. Furthermore, when the reflector is directly installed at the liquid crystal layer side, the steepness of electro-optical characteristics is worsened due to undulations of the reflector.

SUMMARY OF THE INVENTION

It is hence a primary object of the invention to present a reflective type liquid crystal display device of high sharpness and high display quality, without parallax, capable of solving the aforementioned technical problems.

To achieve the above object, the invention presents a reflective type liquid crystal display device comprising a polarizer disposed at an incident light side of a liquid crystal cell, the liquid crystal cell including:
an insulating substrate forming at least a transparent electrode,
a mirror-finished light reflecting member possessing smooth undulations on one surface, forming a light reflecting surface on the same surface, and forming a counter electrode for display driving through collaboration with the transparent electrode, and
a liquid crystal layer having an orientation of liquid crystal molecules selected in either parallel orientation or twisted orientation, being sealed in between the insulating substrate and the mirror finished light reflecting member; and
an optical phase compensating member disposed between the polarizer and the liquid crystal cell.

In the invention, the light transmission state is selected when the retardation $\Delta n_1 d_1$ ($\Delta n_1$: optical anisotropy of liquid crystal layer, $d_1$: thickness of liquid crystal layer) of the liquid crystal cell, and the retardation $\Delta n_2 d_2$ ($\Delta n_2$: optical anisotropy of optical phase compensating member, $d_2$: thickness of optical phase compensating member) of the optical phase compensating member are in the relation of $$|\Delta n_1 d_1 - \Delta n_2 d_2|/\lambda = m/2 \pm 0.1 (m=0, 1, 2, \ldots) \quad (1)$$

in terms of the wavelength $\lambda$ in a range of 400 to 700 nm upon application of voltage V1, and the light shielding state is selected when they are in the relation of $$|\Delta n_1 d_1 - \Delta n_2 d_2|/\lambda = 0.25 + m/2 \pm 0.1 (m=0, 1, 2, \ldots) \quad (2)$$

in terms of the wavelength $\lambda$ in a range of 400 to 700 nm upon application of voltage V2, and the numerical value of $|\Delta n_1 d_1 - \Delta n_2 d_2|/\lambda$ is varied depending on the electric field applied to the liquid crystal layer.

Also, in the invention, the retardation $\Delta n_1 d_1$ of the liquid crystal cell and the retardation $\Delta n_2 d_2$ of the optical phase compensating member are selected so as to satisfy formula (1) in terms of the wavelength $\lambda$ of the light in a range of 400 to 700 nm upon non-application of voltage. Further, the numerical value of $|\Delta n_1 d_1 - \Delta n_2 d_2|/\lambda$ is varied depending on the electric field applied to the liquid crystal layer.

In the invention, moreover, the retardation $\Delta n_1 d_1$ of the liquid crystal cell and the retardation $\Delta n_2 d_2$ of the optical phase compensating member are selected so as to satisfy formula (2) in terms of the wavelength $\lambda$ of the light in a range of 400 to 700 nm upon non-application of voltage, and the numerical value of $|\Delta n_1 d_1 - \Delta n_2 d_2|/\lambda$ is varied depending on the electric field applied to the liquid crystal layer.

In the invention, the light reflecting film forming the light reflecting surface of the light reflecting member confronts the liquid crystal layer side.

In the invention, the light reflecting surface is determined as an electrode surface confronting the transparent electrode formed on the insulating substrate.

In the invention, the optical phase compensating member is a liquid crystal cell comprising a pair of transparent substrates, transparent electrodes formed on the transparent substrates, and a liquid crystal layer inserted between the transparent substrates.

Also in the invention, the optical phase compensating member is a high molecular oriented film.

According to the invention, a transparent flattened layer for absorbing the undulations formed on the surface of the light reflecting member is disposed on the light reflecting surface, and transparent electrodes are formed on this flattened layer. Further, these transparent electrodes are determined as the electrodes confronting the transparent electrodes formed on the insulating substrate.

In the invention, a color filter layer is formed on either the insulating substrate or the transparent electrode formed on the insulating substrate.

The display principle of the reflective type liquid crystal display device of the invention is explained below. The incident light into the reflective type liquid crystal display device of the invention reaches the reflecting member through the polarizer, optical phase compensating member, and liquid crystal layer, and is reflected by the reflecting member, and is emitted through the liquid crystal layer, optical phase compensating member, and polarizer. Herein, when the linear polarized light obtained from the polarizer passes through the optical compensating member and liquid crystal layer, it then becomes elliptical polarized light, and the phase difference $\delta$ of the elliptical polarized light at this time is expressed as $$\delta = (2\pi/\lambda)(\Delta n_1 d_1 - \Delta n_2 d_2) \quad (3)$$

where the symbol $\lambda$ denotes the wavelength of light, $\Delta n_1 d_1$ is the retardation of liquid crystal layer, $\Delta n_2 d_2$ is the retardation of optical phase compensating member, $\Delta n_1$, $\Delta n_2$ are optical anisotropies (birefringences) of liquid crystal layer and optical phase compensating member, and $d_1$, $d_2$ denote the thicknesses of liquid crystal layer and optical phase compensating member.

When the value of $\delta$ in formula (3) is set in the so-called ¼ wavelength condition and ¾ wavelength condition, the incident light is cut off. That is, these conditions are generally expressed as the establishment of the formula $|\Delta n_1 d_1 - \Delta n_2 d_2|/\lambda = 0.25 + m/2$ shown in formula (2). Considering the wavelength dispersion of retardation of the liquid crystal layer, the characteristics of the optical phase compensating member may be set so as to roughly satisfy formula (2) in the wavelength range of 400 to 700 nm, that is, within the visible wavelength range.

The linear polarized light from the polarizer entering the optical phase compensating member passes through the optical phase compensating member and liquid crystal layer satisfying formula (2), and becomes, for example, clockwise circular polarized light, which is reflected by the reflecting member and becomes counterclockwise circular polarized light. On the other hand, when becoming counterclockwise circular polarized light by passing through the liquid crystal, it is reflected by the reflecting member to be clockwise circular polarized light.

Hence, as the reflected light from the reflecting member passes through the liquid crystal layer and optical compensating member, it becomes linear polarized light orthogonal to the linear polarized light before passing through the liquid crystal layer at the time of input, and is cut off by the polarizer.

When the optical phase compensating member satisfies the conditions of optical anisotropy $\Delta n_2$ and thickness $d_2$ so as to suffice formula (1) $|\Delta n_1 d_1 - \Delta n_2 d_2|/\lambda = m/2$, polarized light entering the optical phase compensating member through the polarizer remains to be the same linear polarized light parallel in the direction of polarization even after passing through the optical phase compensating member and liquid crystal layer. Therefore after reflection by the reflecting member or after the reflected light again passes through the liquid crystal layer and optical phase compensating member, the same state of polarization of the linear polarized light parallel in the direction of polarization is maintained. Therefore, the exit light passes through the polarizer. Display is made by making use of these light shielding and transmitting states.

In such a principle of display, if the light reflecting member does not maintain the polarizing performance, conversion from clockwise circular polarized light to counterclockwise circular polarized light or inverse conversion is not done efficiently, and the contrast is lowered.

As a reflecting member maintaining the polarizing performance, a flat mirror-surface reflecting member is known, but since the external object is directly reflected thereon, it is hard to observe the display. The present applicant already filed a patent application on a fabrication method of a reflecting plate. In this patent application, a photosensitive resin is applied and formed on a substrate, and it is further treated to deform the protruding portions into a smooth shape, and a reflection plane is formed thereon. According to this method, the protruding portions may be smoothly formed, and multiple reflection occurs rarely, so that a bright reflection plane maintaining the polarizing performance is obtained. By using such reflecting member, a reflecting plate having both mirror smoothness or polarizing performance and diffusion properties may be obtained.

Thus, according to the invention, the incident light reaches the reflecting member through the polarizer, optical phase compensating member, and liquid crystal layer, and is reflected by the reflecting member to be emitted through the liquid crystal layer, optical phase compensating member, and polarizer. The linear polarized light obtained through the polarizer passes through the optical compensating member and liquid crystal layer, and becomes an elliptical polarized light, and the phase difference δ of this elliptical polarized light is determined in formula (1).

By adjusting the numerical value $(\Delta n_1 d_1 - \Delta n_2 d_2)/\lambda$ in formula (1) by the electric field applied to the liquid crystal layer, light switching action can be realized. That is, the light reflecting member is composed inside of the liquid crystal cell, and the protruding portions on the undulations of the reflection plane of the light reflecting member may be formed smoothly, so that a bright reflection plane with few multiple reflections, which maintains the polarizing property, may be realized. By using such a reflecting member, the reflector having both a polarizing property and a diffusion property is obtained. That is, the parallax can be eliminated, and a reflective type liquid crystal display device of high sharpness and high display quality is realized.

Besides, by parallel orientation or twisted orientation of the liquid crystal molecule, a reflective type liquid crystal display device high in response speed, superior in reliability of display action, and suited to mass production is realized.

The invention moreover provides a reflective type liquid crystal display device comprising an insulating substrate forming at least a transparent electrode, a reflector possessing smoothly and continuously changing undulations on one side and forming a thin film possessing a light reflection function on the same surface, a liquid crystal cell possessing a liquid crystal layer inserted between the insulating substrate and reflector, a polarizer disposed at the light incident side, and a substrate possessing an optical phase compensating function being disposed between the polarizer and liquid crystal cell, wherein the director direction of the liquid crystal molecule of the liquid crystal cell is almost orthogonal to the slow direction of the substrate possessing the optical phase compensating function, the value of $|\Delta n_1 d_1 - \Delta n_2 d_2|/\lambda$ is varied by the electric field applied to the liquid crystal layer so as to establish the light shielding state when the retardation $\Delta n_1 d_1$ of the liquid crystal cell and the retardation $\Delta n_2 d_2$ of the substrate possessing the optical phase compensating function satisfy the formula (2), and the light transmitting state when they satisfy the formula (1), thereby displaying by making use of these two states, and moreover the absorption axis or transmission axis of the polarizer is set in a range of 30° to 60° to the director direction of a liquid crystal molecule of the liquid crystal cell.

In the invention, it is the light shielding state when the retardation $\Delta n_1 d_1$ of the liquid crystal cell and the retardation $\Delta n_2 d_2$ of the substrate possessing the optical phase compensating function satisfy the formula (2) for a certain wavelength λ in a range of 400 to 700 nm when voltage $V_1(V_1 \geq 0)$ is applied, and the light transmitting state when they satisfy the formula (1) for a certain wavelength λ in a range of 400 to 700 nm when voltage $V_2(V_2 > V_1)$ is applied, the relation is $(\Delta n \lambda)_F > (\Delta n \lambda)_{LC}$ when the magnitude $(\Delta n \lambda)_F$ of wavelength dispersion of the substrate possessing the optical phase compensating function and the magnitude $(\Delta n \lambda)_{LC}$ of wavelength dispersion of the liquid crystal cell satisfy the condition of $\Delta n_1 d_1 > \Delta n_2 d_2$ in the light shielding state, and it is $(\Delta n \lambda)_F < (\Delta n \lambda)_{LC}$ when satisfying the condition of $\Delta n_1 d_1 < \Delta n_2 d_2$ in the light shielding state.

Also in the invention, it is the light transmitting state when the retardation $\Delta n_1 d_1$ of the liquid crystal cell and the retardation $\Delta n_2 d_2$ of the substrate possessing the optical phase compensating function satisfy the formula (1) for a certain wavelength in a range of 400 to 700 nm when voltage $V_1(V_1 \geq 0)$ is applied, and the light shielding state when they satisfy the formula (2) for a certain wavelength in a range of 400 to 700 nm when voltage $V_2(V_2 > V_1)$ is applied, the relation is $(\Delta n \lambda)_F > (\Delta n \lambda)_{LC}$ when the magnitude $(\Delta n \lambda)_F$ of wavelength dispersion of the substrate possessing the optical phase compensating function and the magnitude $(\Delta n \lambda)_{LC}$ of wavelength dispersion of the liquid crystal cell satisfy the condition of $\Delta n_1 d_1 > \Delta n_2 d_2$ in the light shielding state, and it is $(\Delta n\lambda)_F<(\Delta n\lambda)_{LC}$ when satisfying the condition of $\Delta n_1 d_1<\Delta n_2 d_2$ in the light shielding state.

In the invention, the reflective film forming plane of the reflector is disposed at the liquid crystal layer side.

In the invention, the thin film possessing the Light reflecting function of the reflector functions also as the electrode confronting the transparent electrode formed on the insulating substrate.

In the invention, a transparent flattened layer for absorbing undulations is provided on the thin film possessing the light reflecting function, and a transparent electrode is formed thereon so as to function as the electrode confronting the electrode formed on the insulating substrate.

In the invention, a color filter layer is formed on the insulating substrate or transparent electrode.

The principle of display of the reflective type liquid crystal display device of the invention is described below. FIG. 6 is an operation explanatory diagram of the reflective type liquid crystal display device of the invention.

The incident light to the reflective type liquid crystal display device of the invention passes through the polarizer 15, optical phase compensator 14, and liquid crystal layer 13, and is reflected by the reflector 8, and passes through the liquid crystal layer 13, optical phase compensator 14, and polarizer 15 to be emitted. The linear polarized light obtained from the polarizer 15 passes through the optical phase compensator 14 and liquid crystal layer 13, and then becomes elliptical polarized light. At this time, the phase difference δ of the elliptical polarized light is expressed as follows.

$$\delta=(2\pi/\lambda)\,(\alpha n_1 d_1-\Delta n_2 d_2) \quad (3)$$

where λ is the wavelength, $\Delta n_1 d_1$ is the retardation of liquid crystal layer, $\Delta n_2 d_2$ is the retardation of optical phase compensator, $\Delta n_1$, $\Delta n_2$ are optical anisotropies (birefringences) of the liquid crystal layer and optical phase compensator respectively, and $d_1$, $d_2$ are thicknesses of the liquid crystal layer and optical phase compensator respectively.

When the value δ in the formula (3) is set in the so-called ¼ wavelength condition and ¾ wavelength condition, the incident light is cut off. Generally, the condition is expressed as the establishment of $$|\Delta n_1 d_1-\Delta n_2 d_2|/\lambda=0.25+m/2(m=0, 1, 2, \ldots) \quad (4)$$

and therefore the incident light is cut off when the value δ in the formula (3) is so set as to satisfy the formula (4).

More specifically, the incident linear polarized light passes through the optical phase compensator 14 and liquid crystal layer 13 satisfying the specified condition to be, for example, clockwise circular polarized light, and is reflected by the reflector to be counterclockwise circular polarized light. To the contrary, when counterclockwise circular polarized light enters, clockwise circular polarized light is obtained.

Consequently, passing again through the liquid crystal layer 13 and optical phase compensator 14, it becomes a linear polarized light orthogonal to the linear polarized light after passing through the polarizer, which is cut off by the polarizer. Besides, when satisfying $$|\Delta n_1 d_1-\Delta n_2 d_2|/\lambda=m/2(m=0, 1, 2, \ldots) \quad (5)$$

the incident linear polarized light is emitted from the same polarization plane even after passing through the liquid crystal layer 13, and the light passes through the polarizer 15. Therefore, display is made by making use of these two states.

Actually, the light shielding state and light transmitting state are not always required to satisfy the conditions of the formula (4) and formula (5), and it is practically enough as far as the light shielding state satisfies the formula (2) and the light transmitting state satisfies the formula (1).

In this principle of display, if the light reflector does not possess a polarizing property, conversion from clockwise circular polarized light to counterclockwise polarized light or its inverse conversion is not done efficiently, and the contrast is lowered.

As a reflecting member maintaining the polarizing performance, a flat mirror-surface reflecting member is known, but since the external object is directly reflected thereon, it is hard to observe the display. The present applicant already filed a patent application on a fabrication method of reflecting plate. In this patent application, a photosensitive resin is applied and formed on a substrate, and it is further treated to deform the protruding portions into a smooth shape, and a reflection plane is formed thereon.

According to this method, the protruding portions may be smoothly formed, and multiple reflection occurs rarely, so that a bright reflection plane nearly maintaining the polarizing performance is obtained. By using such reflecting member, a reflecting plate having both mirror smoothness or polarizing performance and a diffusion property may be obtained.

Moreover, in the light shielding state when voltage $V_1(V_1\geq 0)$ is applied and in the light transmitting state when voltage $V_2(V_2>V_1)$ is applied, the formula (4) may be satisfied in a wide range of wavelength region by satisfying $(\Delta n\lambda)_F>(\Delta n\lambda)_{LC}$ when $\Delta n_1 d_1>\Delta n_2 d_2$ in the light shielding state or $(\Delta n\lambda)_F<(\Delta n\lambda)_{LC}$ when $\Delta n_1 d_1<\Delta n_2 d_2$ in the light shielding state.

Likewise, in the light transmitting state when voltage $V_1(V_1\geq 0)$ is applied and in the light shielding state when voltage $V_2(V_2>V_1)$ is applied, the formula (4) may be satisfied in a wide range of wavelength region by satisfying $(\Delta n\lambda)_F>(\Delta n\lambda)_{LC}$ when $\Delta n_1 d_1>\Delta n_2 d_2$ in the light shielding state or $(\Delta n\lambda)_F<(\Delta n\lambda)_{LC}$ when $\Delta n_1 d_1<\Delta n_2 d_2$.

That is, the wavelength dispersion of the smaller retardation in the light shielding state is set larger than the other wavelength dispersion. As a result, the wavelength dispersions of the liquid crystal cell and the substrate possessing the optical phase compensating function cancel each other in the light shielding state, so that an excellent display of high contrast is obtained.

According to the reflective type liquid crystal display device of the invention, the reflecting member may be disposed at the liquid crystal layer side, and the light is cut off efficiently by defining φ=30° to 60°. Furthermore, in the light shielding state, by adjusting the wavelength dispersion of the liquid crystal layer and optical phase compensating member, the condition of the light shielding state can be satisfied in a wavelength region of a much wider range than in the conventional phase difference plate, so that a reflective type liquid crystal display device of no parallax, high contrast, high definition, and high display quality is realized.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other and further objects, features, and advantages of the invention will be more explicit from the following detailed description taken with reference to the drawings, which are given by way of illustration only, and thus are not limitative of the present invention, and wherein.

DETAILED DESCRIPTION OF THE PREFERRED EMBODIMENTS

Figure 1:
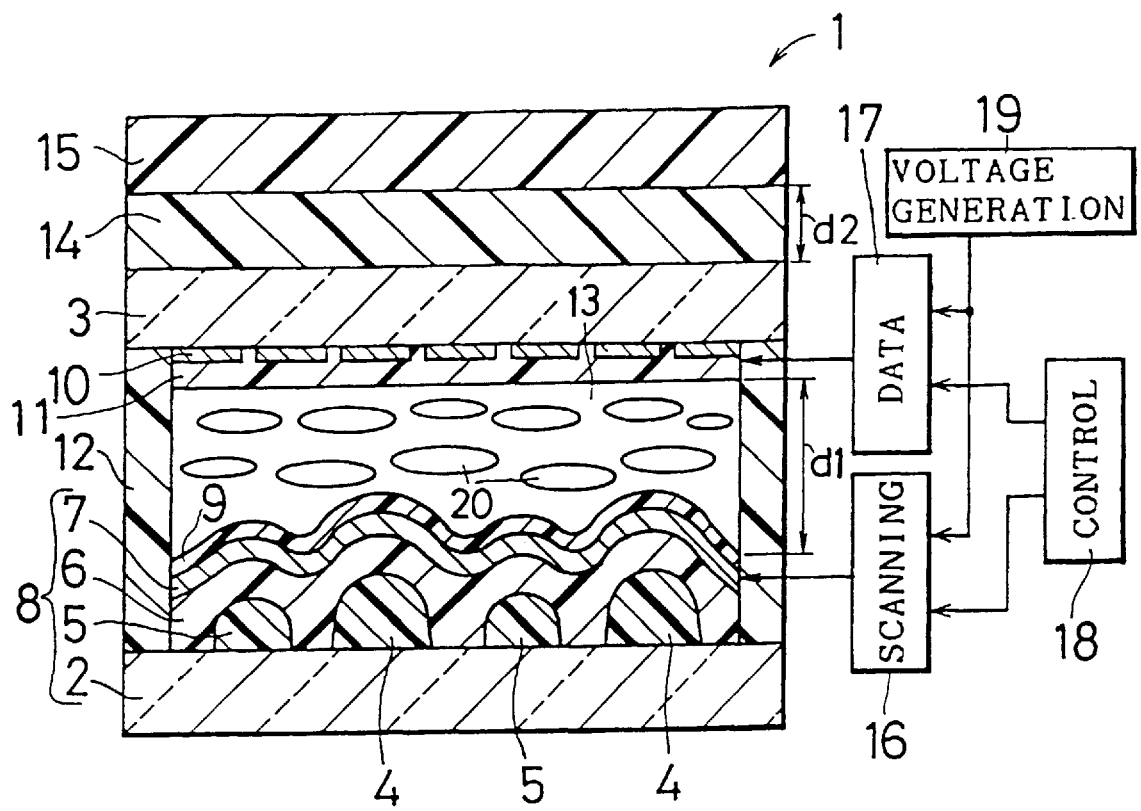
FIG. 1 is a sectional view of a liquid crystal display device 1 according to an embodiment of the invention.

Now referring to the drawing, preferred embodiments of the invention are described below.

[First Embodiment]

Figure 2:
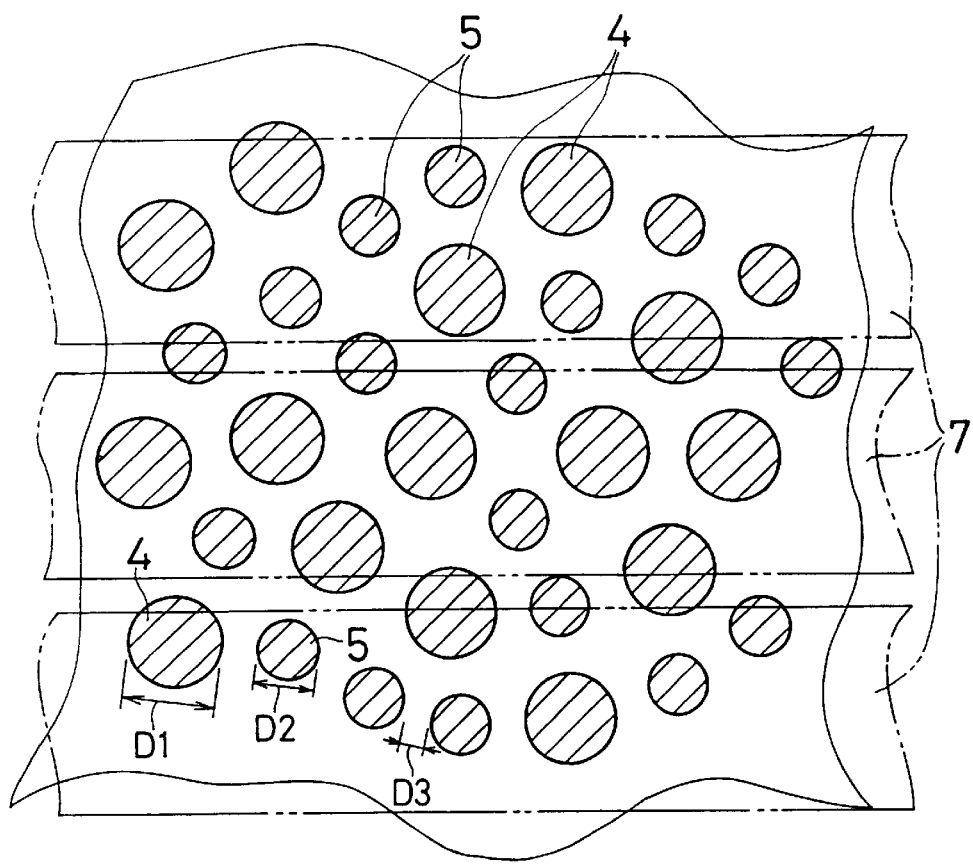
FIG. 2 is a plan view of a glass substrate 2.

FIG. 1 is a sectional view of a reflective type liquid crystal display device (hereinafter called liquid crystal display device) 1 in an embodiment of the invention, and FIG. 2 is a plan view of a glass substrate 2 in the liquid crystal display device 1. The liquid crystal display device 1 of the embodiment is, for example, of simple matrix type. The liquid crystal display device 1 possesses a pair of transparent glass substrates 2, 3, many large bumps 4 and small bumps 5 made of a synthetic resin material, described later, are formed on the glass substrate 2. The bottom diameters D1, D2 of large bumps 4 and small bumps 5 are defined, for example, at 5 $\mu$m and 3 $\mu$m respectively, and their interval D3 is defined, for example, at 2 $\mu$m or more.

Covering these bumps 4, 5 and burying gaps among bumps 4, 5, a smoothing film 6 is formed. The surface of the smoothing film 6 is formed in a smooth curvature due to effects of the bumps 4, 5. On the smoothing film 6, a reflective metal film 7 made of a metal material such as aluminum, nickel, chromium and silver is formed. The reflective metal film 7 is formed in plural rows in a longitudinal band form in the lateral direction in FIG. 2 as shown in FIG. 2. The bumps 4, 5, smoothing film 6 and reflective metal film 7 on the glass substrate 2 compose a reflector 8 which is a light reflecting member. An orientation film 9 is formed on the reflective metal film 7.

On the surface of the glass substrate 3 confronting the glass substrate 2, transparent electrodes 10 made of ITO (indium tin oxide) or the like are formed in plural rows, in a longitudinal band form in the direction orthogonal to the longitudinal direction of the reflective metal film 7. The reflective metal film 7 and transparent electrodes 10 are combined to compose a matrix electrode structure. Covering the glass substrate 3 on which the transparent electrodes 10 are formed, an orientation film 11 is formed, and the peripheral margin of the mutually confronting glass substrates 2, 3 is sealed with a sealing material 12. Between the orientation films 9, 11, a liquid crystal layer 13, for example, a liquid crystal material of which dielectric anisotropy $\Delta\in$ is positive, such as tradename ZLI4792, ZLI2973 of Merck, is inserted.

On the opposite side of the liquid crystal layer 13 of the glass substrate 3, an optical compensating plate 14 which is an optical phase compensating member made of polycarbonate oriented film (optical anisotropy $\Delta n_2$, thickness $d_2$) is provided, and a polarizer 15 with single transmissivity of 48% is disposed thereon.

A scanning circuit 16 and a data circuit 17 are connected to the reflective metal film 7 and transparent electrode 10. The scanning circuit 16 and data circuit 17 realize display by applying display voltage V1 or non-display voltage V2 from a voltage generating circuit 19, while scanning the reflective metal film 7 and transparent electrode 10 on the basis of the display data corresponding to the display content, by the control of a control circuit 18 such as a microprocessor.

Figure 3:
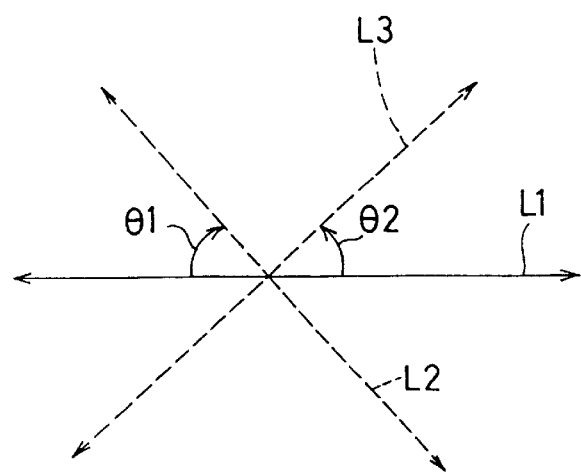
FIG. 3 is a diagram explaining the optical characteristics of the liquid crystal display device 1.

FIG. 3 is a diagram showing an optical composition of polarizer 15, optical compensator 14 and liquid crystal layer 13. That is, to the axial direction L1 of the absorption axis or transmission axis of the polarizer 15, the angle $\theta 1$ of the axial direction L2 of the slow direction of the optical compensator 14 in the clockwise direction is defined, for example, at 45°. On the other hand, the angle $\theta 2$ of the orientation direction L3 of the liquid crystal molecule 20 of the liquid crystal layer 13 shown in FIG. 1 to the axial direction L1 in the counterclockwise direction is defined, for example, at 45°.

Figure 4:
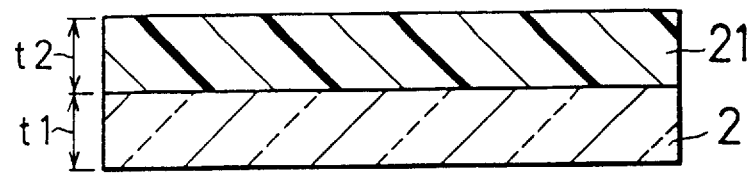
FIG. 4 (1)–(5) are sectional views explaining the manufacturing process of a reflector 8.
Figure 4:
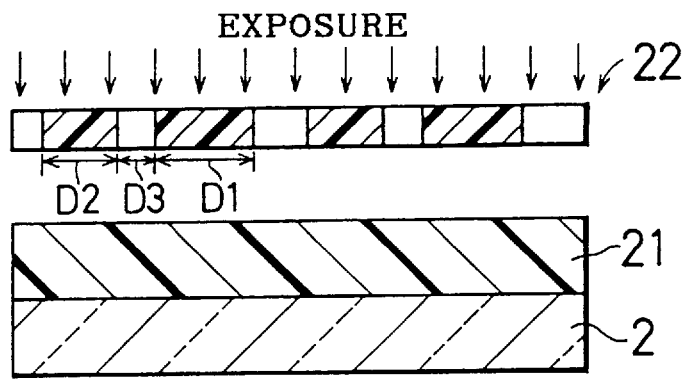
Figure 4:
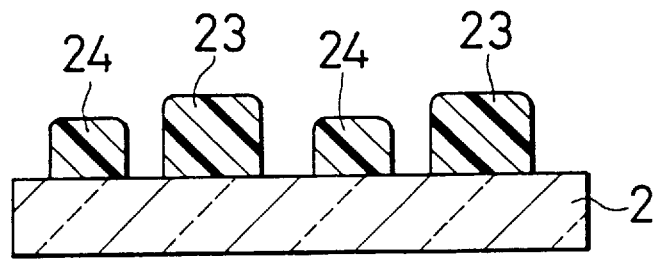
Figure 4:
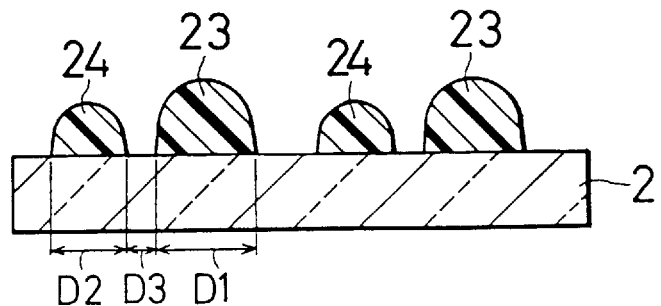
Figure 4:
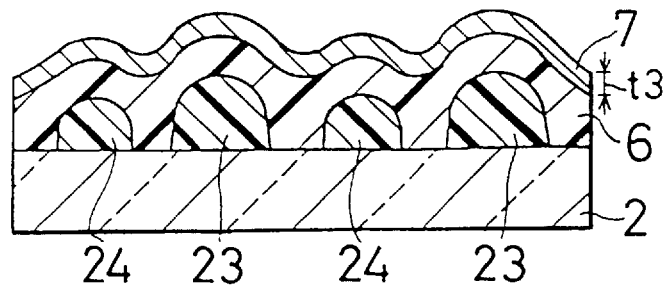

FIG. 4 is a sectional view explaining the manufacturing process of the reflector 8 shown in FIG. 1. As shown in FIG. 4 (1), in this embodiment, a glass substrate 2 (tradename 7059 of Corning) in thickness t1 (for example, 1.1 mm) is used. On the glass substrate 2, for example, a photosensitive resin material such as tradename OFPR-800 of Tokyo Okasha is applied by spin coating at 500 to 3000 rpm, and a resist film 21 is formed. In this embodiment, preferably, by spin coating for 30 seconds at 2500 rpm, the resist film 21 is formed in thickness t2 (for example, 1.5 $\mu$m).

Consequently, the glass substrate 2 on which the resist film 21 is formed is baked for 30 minutes at 90° C., and then, as shown in FIG. 4 (2), it is exposed by placing a photo mask 22 forming multiple circular patterns of two types of large and small size described below, and is developed in a developing solution composed of 2.38% solution of, for example, tradename NMD-3 of Tokyo Okasha, and large bumps 23 and small bumps 24 at different heights are formed on the surface of the glass substrate 2 as shown in FIG. 4 (3). The reason of forming bumps of two or more types differing in height is intended to prevent coloring of reflected light due to interference of light reflected by the tops and bottoms of the bumps.

The photo mask 22 is a random configuration of circles of diameter D1 (for example, 5 $\mu$m) and diameter D2 (for example, 3 $\mu$m) as shown in the layout of large bumps 4 and small bumps 5 in FIG. 2, and the interval D3 of the circles is defined to be at least 2 μm or more. The pattern of the photo mask 22 is not limited to this. The glass substrate 2 in the manufacturing stage in FIG. 4 (3) is heated for an hour at 200° C., and the tops of the bumps 23, 24 are slightly melted to form in an arc profile as shown in FIG. 4 (4). Furthermore, as shown in FIG. 4 (5), on the glass substrate 2 in the manufacturing stage in FIG. 4 (4), the same material as the photosensitive resin material is applied by spin coating at 1000 to 3000 rpm. In this embodiment, preferably, it is applied by spin coating at 2000 rpm. As a result, the recesses among bumps 23, 24 are filled up, and the formed surface of the smoothing film 6 can be formed into a relatively moderate and smooth curvature. In the embodiment, as the smoothing film 7, the same resin as the photosensitive resin material was applied, but different kind may be used. In this case, the surface step was 0.7 μm.

Furthermore, on the surface of the smoothing film 6, a metal thin film of aluminum, nickel, chromium or silver is formed in a thickness of t3 (for example, 0.01–1.0 μm). In this embodiment, by sputtering aluminum, the reflective metal film 7 is formed. As a result, the reflector 8 is completed.

A polyimide resin film is formed on the glass substrates 2, 3, and is baked for an hour at 200° C. Afterwards, rubbing is applied to orient the liquid crystal molecule 20. Thus, orientation films 9, 11 are formed. The sealing material 12 for sealing between these glass substrates 2, 3 is formed by screen printing an adhesive seal material containing a spacer in a diameter of, for example, 6 μm.

When combining the thus formed reflector 8 and the glass substrate 3 on which the transparent electrodes 10 and orientation film 11 are formed, a spacer in a diameter of 5.5 μm is directly applied between the glass substrates 2 and 3, and the thickness of the liquid crystal layer is defined. The liquid crystal layer 13 is adhered with the seal material 12, with the glass substrates 2, 3 facing each other, and is evacuated and sealed. The refractive anisotropy $\Delta n_1$ of the liquid crystal layer 13 is 0.094, and the layer thickness $d_1$ is, for example, 5.5 μm, and therefore the retardation $\Delta n_1 d_1$ of this liquid crystal layer 13 is 517 nm.

Figure 5:
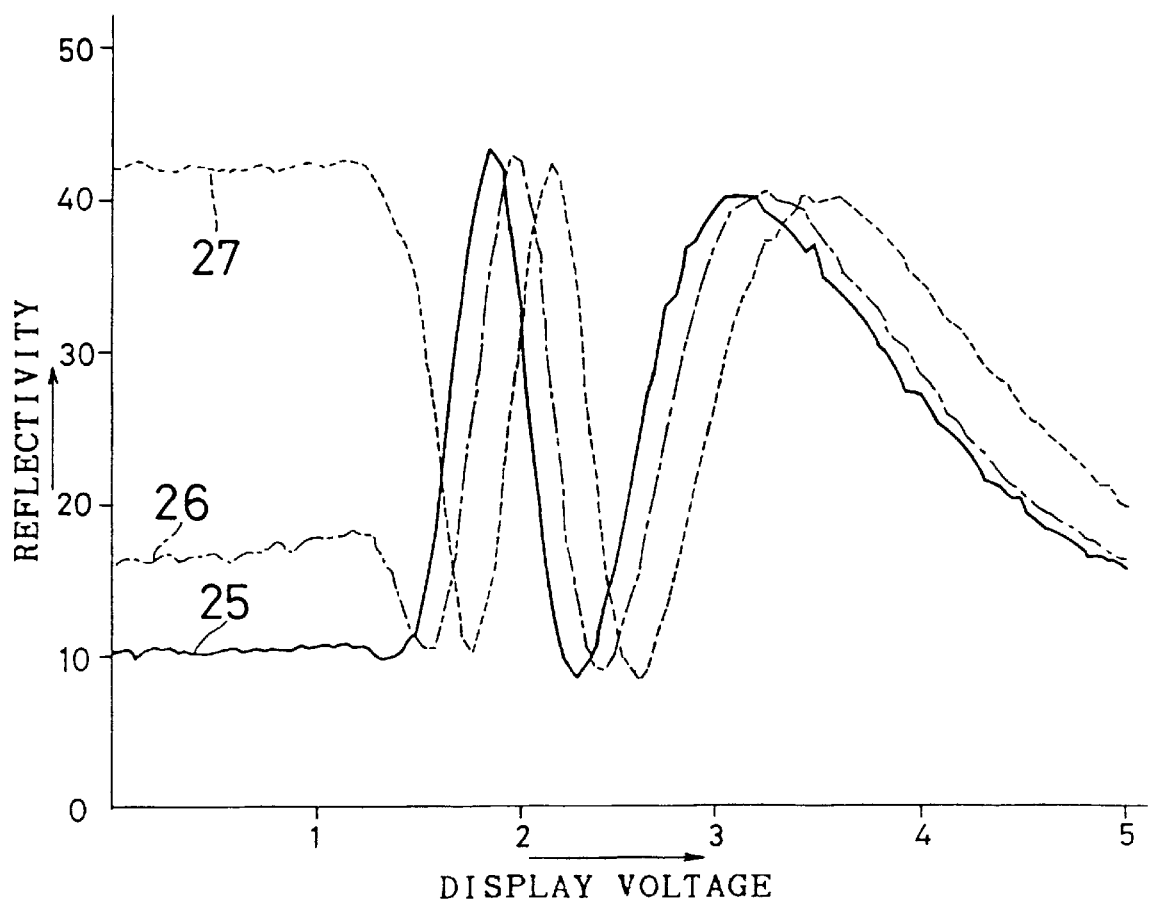
FIG. 5 is a graph explaining the voltage-reflectivity characteristics of the liquid crystal display device 1;, FIG. 6 (1), (2) are diagrams explaining the display action of the liquid crystal display device 1 of the same embodiment.

FIG. 5 is a graph showing the voltage/reflectivity characteristics of the liquid crystal display device 1 of the embodiment. In order to achieve the numerical value $(\Delta n_1 d_1 - \Delta n_2 d_2)/\lambda = 0.25$, 0.3, 0.5 upon input of light with the wavelength λ of 550 nm, the retardation $\Delta n_2 d_2$ of the optical compensator 14 is selected. In the case of each numerical value, the characteristic curves 25, 26, 27 in FIG. 5 are obtained. That is, the characteristic curve 25 corresponds to the case of m=0 in the formula (2), and the characteristic curve 27, to the case of m=1 in the formula (1).

The characteristic curve 26 satisfies neither formula (1) nor formula (2), and exhibits an intermediate state between the characteristic curve 27 in which the reflected light from the reflector 8 is emitted from the liquid crystal display device 1 when no voltage is applied, and the characteristic curve 25 in which the reflected light is cut off. Further, it satisfies either formula (1) or formula (2) when the voltage is V1, or the other one of formula (1) or formula (2) when the voltage is V2, thereby realizing a favorable display quality at this time. That is, in this embodiment, by selecting the retardation of the optical compensator 14 or liquid crystal layer 13 in order that the formula (1) and formula (2) may be satisfied, a high display quality is realized.

According to experimentation performed by the present inventor using this embodiment, when a voltage was applied, the reflectivity in the normal direction to the light entering from a direction inclined by 30° from the normal direction of the liquid crystal display device 1 was about 45% at maximum, and the maximum contrast ratio was 7. As the reference material for determining the contrast ratio at this time, a standard white plate of magnesium oxide MgO was used. Incidentally, in the graph shown in FIG. 5 it is when the numerical value $(\Delta n_1 d_1 - \Delta n_2 d_2)/\lambda$ is ±0.25 that the reflectivity is lowered, and the maximum reflectivity is achieved when the numerical value $(\Delta n_1 d_1 - \Delta n_2 d_2)/\lambda$ is 0, 0.5. By using these two states, a monochromatic display is realized.

The embodiment related to the case of m=1 in formula (1) and m=0 in formula (2) only, but similar effects were confirmed if the variable m was other values. Meanwhile, in both formula (1) and formula (2), the effect is expressed when the difference of retardation between the liquid crystal layer and film shows a specific value, but actually this value varies depending on the fluctuations of the thickness of liquid crystal film and thickness of film. Accordingly, effects of fluctuations of these values on the contrast were studied, but there was no serious effect in a range of ±0.1 or less in either formula (1) or formula (2), and it was found to be sufficiently practicable.

FIG. 6 is a diagram explaining the action of the liquid crystal display device 1 of the embodiment, in which the liquid crystal display device 1 is shown in a disassembled state for the convenience of explanation. In the light shielding action shown in FIG. 6 (1), when the incident light 28 passes through the polarizer 15, it becomes linear polarized light 29 parallel to the axial direction L1 of the polarizer 15. The linear polarized light 29 passes through the optical compensator 14 and liquid crystal layer 13 satisfying the formula (2), and becomes, for example, clockwise circular polarized light 30. This circular polarized light 30 is reflected by the reflector 8 to be counterclockwise circular polarized light 31. When this circular polarized light 31 passes through the liquid crystal layer 13 and optical compensator 14 possessing the retardations satisfying the formula (2), it becomes a linear polarized light 32 possessing a polarization plane in the direction orthogonal to the direction of the linear polarized light 29 at the time of the incidence. This linear polarized light 32 is cut off by the polarizer 15. That is, the reflected-light from the reflector 8 is cut off.

By contrast, in the light transmitting action shown in FIG. 6 (2), the retardations $\Delta n_2 d_2$, $\Delta n_1 d_1$ of the optical compensator 14 and liquid crystal layer 13 are selected so as to satisfy the formula (1). At this time, when the incident light 28 passes through the polarizer 15, it becomes a linear polarized light 29 parallel to the axial direction L1. This linear polarized light 29, if passing through the optical compensator 14 and liquid crystal layer 13 determined to satisfy the formula (1), maintains the same polarized state. If the linear polarized light 29 passing through the liquid crystal layer 13 is reflected by the reflector 8, the same linear polarized state is maintained, and it is the same even after passing through the liquid crystal layer 13 and optical compensator 14. Therefore, this reflected light passes through the polarizer 15 and is emitted.

In this embodiment, as the optical compensator 14, a oriented film made of polycarbonate is used. However, the invention is not limited to this alone, and other drawn films of, for example, polyvinyl alcohol (PVA) and polymethyl methacrylate (PMMA) may be also used. Besides, a liquid crystal cell forming orientation films on the surfaces of a pair of glass substrates, and injecting the liquid crystal layer between orientation films to orient in parallel may be also used as an optical phase compensator. In this case, the retardation of the liquid crystal layer is also the value defined in the formula (1) and formula (2). The liquid crystal molecule is arranged so as to be orthogonal to the liquid crystal molecule of the display cell.

In the reflective type liquid crystal display device 1 of the invention, since the surface of forming the reflective metal film 7 of the reflector 8 is disposed at the liquid crystal layer 13 side, the parallax for observing the liquid crystal display device 1 may be eliminated, so that a favorable display screen may be obtained. In the case of the constitution in which the liquid crystal display device 1 is driven by an active matrix, when used as the pixel electrode connected to the nonlinear element in the thin film transistor or MIM (metal-insulating film-metal) structure used as switching element, it is confirmed that an excellent display quality as mentioned above is realized.

Moreover, to increase the steepness of electro-optical characteristics, it is preferred that the retardation $\Delta n_1 d_1$ of the liquid crystal layer 13 be uniform regardless of the location. Strictly speaking, if the reflector 8 has undulations due to bumps 4, 5 as mentioned above, the film thickness of the liquid crystal layer 13 varies between the tops of the bumps 4, 5 and bottoms among the bumps 4, 5, and therefore the retardation varies. Accordingly, the present inventor has added a flattened layer in a preferred embodiment, made of, for example, acrylic resin, for smoothing by filling up the surface undulations of the reflective metal film 7 on the reflective metal film 7 of the reflector 8 shown in FIG. 1, and formed the transparent electrodes such as ITO thereon in the same shape as the reflective metal film 7, thereby forming an electrode for display. Thus, the height difference of the bumps on the surface of the flattened layer may be defined within 0.1 $\mu$m.

By such a composition, the steepness of the electro-optical characteristics may be markedly enhanced. In this case, whether organic material or inorganic material, any transparent film having a flattening capability may be used regardless of the material. Hence, it has been confirmed that simple multiplex driving of more than 100 scanning lines is possible.

Instead of the glass substrate 2 in the embodiment, it is confirmed that the same effects are exhibited also attained by a transparent substrate such as a silicon substrate. When using such a silicon substrate as the glass substrate 2 in the embodiment, it is advantageous because the circuit elements such as the scanning circuit 16, data circuit 17, control circuit 18, and voltage generating circuit 19 may be formed by integrating them on the silicon substrate.

In another embodiment of the invention, a nematic liquid crystal twisted 240° between the glass substrates 2 and 3 (for example, tradename SD-4107 of Chisso) may be used as the liquid crystal layer 13. In this embodiment, as the optical compensator 14 in the structure shown in FIG. 1, an oriented film of polycarbonate was used, and the retardations $\Delta n_1 d_1$, $\Delta n_2 d_2$ of the liquid crystal layer 13 and optical compensator 14 were adjusted so as to satisfy the conditions of the formula (1) and formula (2). The other constituent elements were the same as in the constitution shown in FIG. 1. In this constitution, according to experimentation by the inventor, the display contrast was 6 in the case of 1/200 duty drive, and a favorable display characteristic free from parallax was realized.

In this embodiment, the liquid crystal layer 13 was a 240° twisted liquid crystal, but the invention is not limited to this alone, and the liquid crystal material of any twist angle, or liquid crystal material without twist may be used in the invention as long as it is a liquid crystal material possessing the characteristics capable of controlling the retardation by electric field. Besides, as the optical compensator 14, retardation can be set, and the invention may be realized by using a liquid crystal material capable of optimally setting the retardation so as to satisfy the conditions of the formula (1) and formula (2).

The invention is not limited to the foregoing embodiments alone, and may be applied in wider reflective type optical control devices. Moreover, by forming a color filter layer on one substrate, multi-color or full-color display may be realized.

[Second Embodiment]

Figure 7:
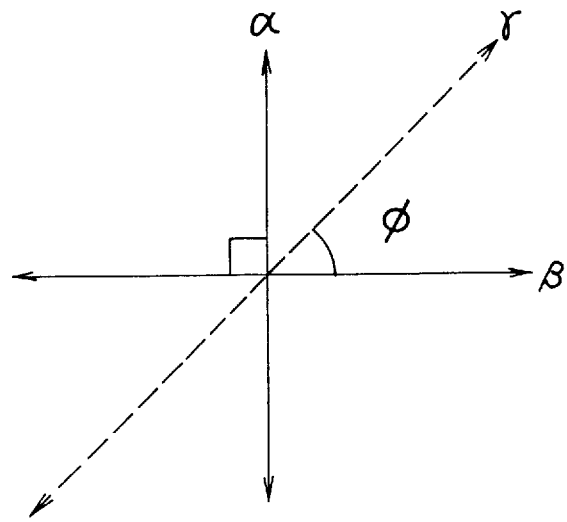
FIG. 7 is an optical characteristic explanatory diagram of a liquid crystal display device in a second embodiment of the invention.

FIG. 7 shows the setting angles of a slow direction ($\alpha$) of the optical phase compensator 14, director ($\beta$) of the liquid crystal molecule of the liquid crystal layer 13, and the absorption axis or transmission axis ($\gamma$) of the polarizer 15 in a second embodiment of the invention. In this embodiment, as the liquid crystal material, tradename ZLI2973 of Merck was used.

Figure 8:
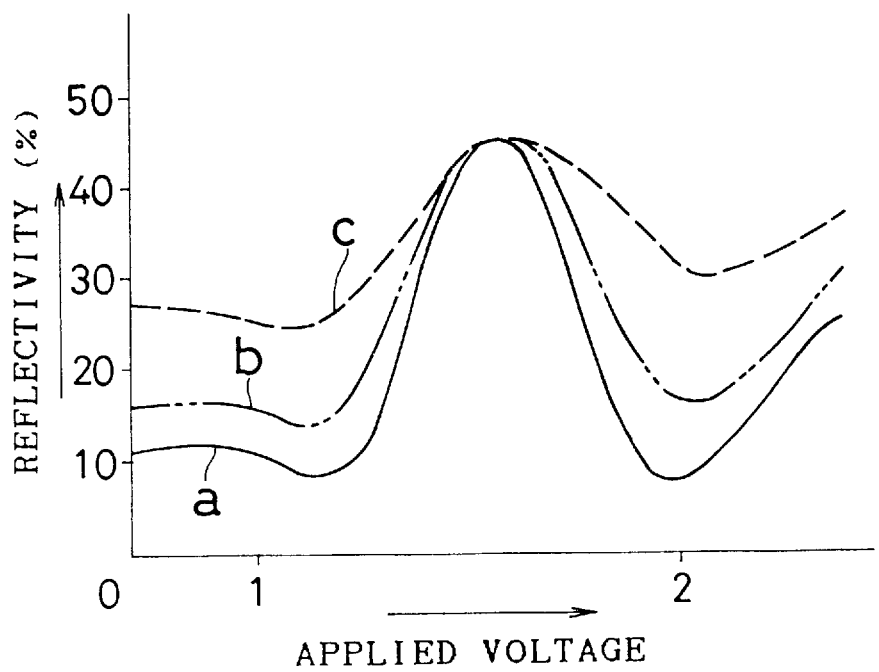
FIG. 8 is a diagram showing the voltage dependence of reflectivity of a reflective type liquid crystal display device of the invention.

The refractive anisotropy $\Delta n_1$ of the liquid crystal used in the embodiment is 0.1626, and the cell thickness d is 5.5 $\mu$m, and hence the retardation $\Delta n_1 d_1$ of the liquid crystal layer 13 is 894 nm. The director of the liquid crystal molecule of the liquid crystal layer 13 and the slow direction of the optical phase compensator 14 cross orthogonally, and the angle $\phi$ formed by the absorption axis or transmission axis of the polarizer 15 and the director of the liquid crystal molecule is 15°, 30°, 45°, 60°, and 70°. The retardation $\Delta n_2 d_2$ of the optical phase .XQ215E compensator 14 was selected so as to be $(\Delta n_1 d_1 - \Delta n_2 d_2)/\lambda = 0.25$ when the wavelength $\lambda$ was 550 nm, and the voltage-reflectivity characteristics in the case of $\phi=15°, 30°, 45°, 60°, 75°$ were measured, of which results are shown in FIG. 8. That is, the characteristics in the case of $\phi=45°, 30°, 15°$ correspond to the characteristic curves a, b, c in FIG. 8. Incidentally, the characteristics at $\phi=60°, 75°$ were respectively almost the same as the characteristic curve b of $\phi=30°$, and the characteristic curve c of $\phi=15°$.

When a voltage was applied, the reflectivity in the panel normal direction to the light entering from a certain angle ($\theta=30°$) was about 45%, and the maximum contrast ratio was 6 at $\phi=45°$. As the reference, a standard white plate of MgO is used. In this graph, it is when $(\Delta n_1 d_1 - \Delta n_2 d_2)/\lambda$ is $\pm 0.25$ that the reflectivity is lowered, and the maximum reflectivity is observed when the value of $(\Delta n_1 d_1 - \Delta n_2 d_2)/\lambda$ is 0. By making use of these two states, a monochromatic display is achieved.

As for the setting angle, when $\phi=45°$, the maximum contrast ratio is obtained, and the contrast ratio declines when going away from $\phi=45°$. Practically, however, there is no problem in the range of $\phi=30°$ to $60°$.

The invention relates to the case in which the value of m in the formula (4) and formula (5) is 0, but display is possible if m is 1 or more. In this case, however, the reflectivity in the light transmission state is lowered, and the reflectivity in the light shielding state is raised to the contrary, and hence the contrast ratio is lowered, and preferably it is desired to be used in the condition of m=0.

In this embodiment, as the optical phase compensator, an oriented film made of polycarbonate is used, but it is not limitative, and other oriented films of PVA (polyvinyl alcohol), PMMA (polymethyl methacrylate) and others can be used. Besides, a liquid crystal cell by parallel orientation treatment may be also used as the optical phase compensator.

In the reflective liquid crystal display device of the invention, the side of the reflector forming reflective electrodes is disposed at the liquid crystal layer side, parallax is eliminated, and a favorable display screen is obtained.

The inventors also confirmed that active matrix drive is possible by using the reflective electrodes as the pixel electrodes of thin film transistors, MIM and other nonlinear elements. Furthermore, to increase the steepness of the electro-optical characteristics, it is better to keep the retardation constant regardless of the location. However strictly speaking, if there is a step in the reflector, the cell thickness differs between above and below the step, and hence the retardation value varies. Accordingly, the inventors formed a flattened layer made of an acrylic resin on the reflector, and a transparent electrode of ITO is formed thereon as a pixel electrode, and the step is controlled at 0.1 μm. Thus, it has been confirmed that the steepness of the electro-optical characteristics be enhanced outstandingly.

As the flattened layer, any transparent film possessing flattening capability, whether an inorganic material or an organic material, may be used. Hence, simple multiplex driving of more than 100 scanning lines can be realized.

In the embodiment, glass substrates were used, but similar effects are expected by forming active elements by opaque substrates such as silicon substrates.

Figure 9A:
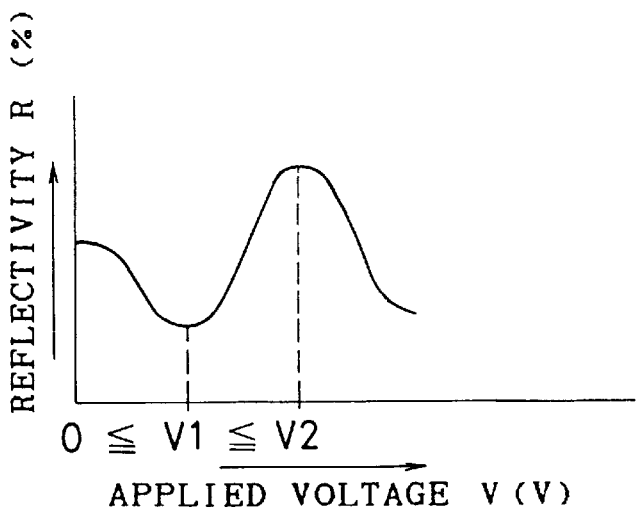
FIG. 9 (a),(b),(c) are principle explanatory diagrams of another embodiment of the invention.
Figure 9B:
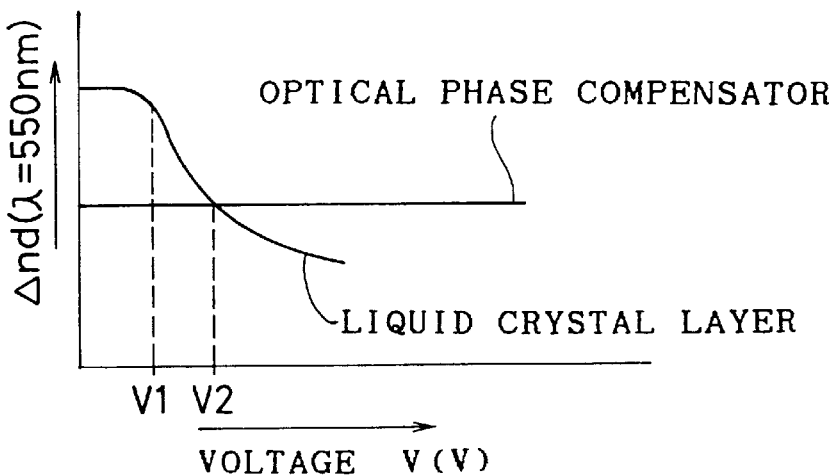
Figure 9C:
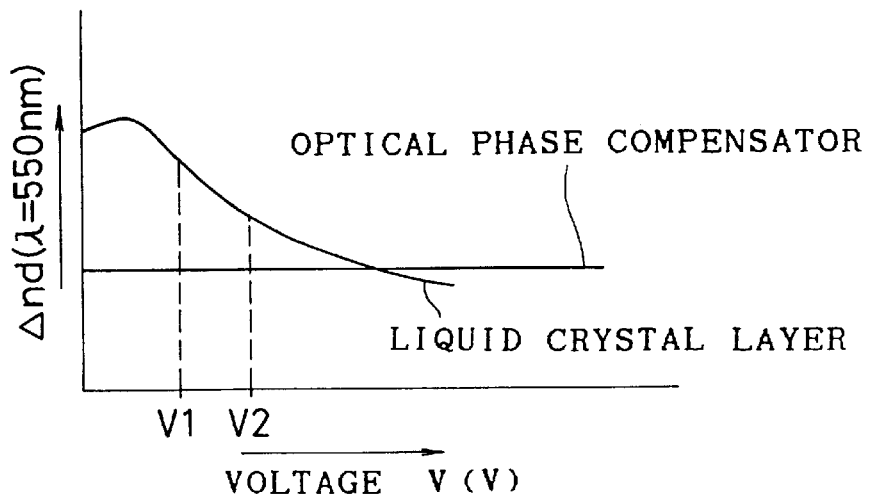
Figure 10A:
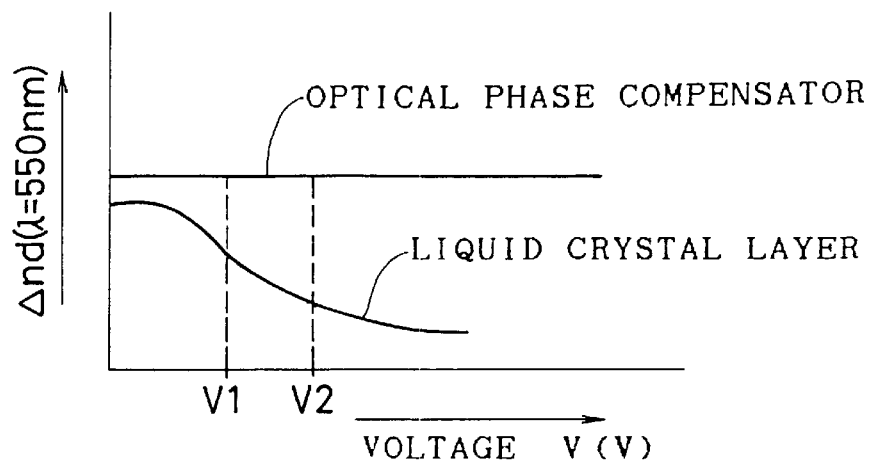
FIG. 10 (a),(b),(c),(d) are principle explanatory diagrams of a different embodiment of the invention.
Figure 10B:
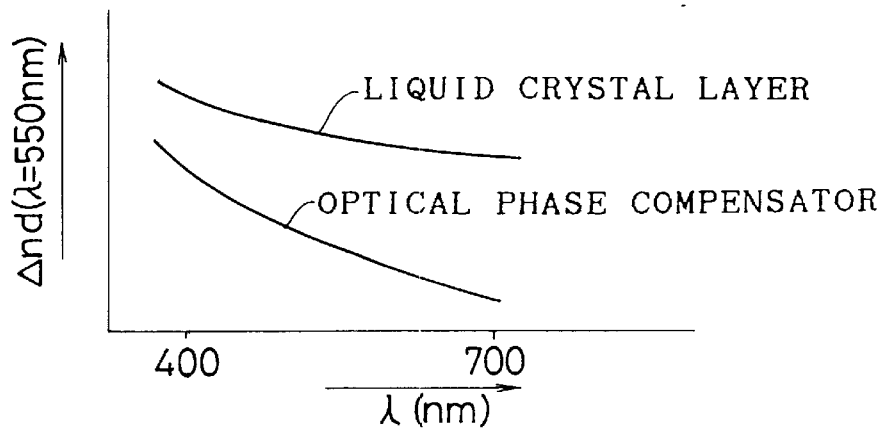
Figure 10C:
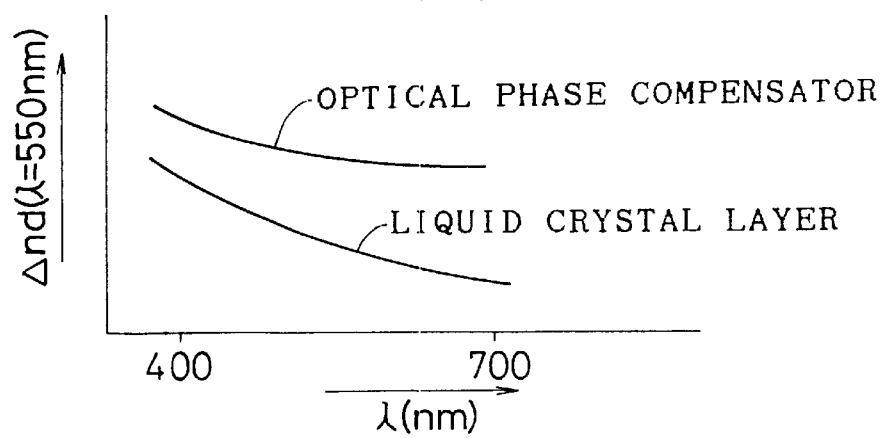
Figure 10D:
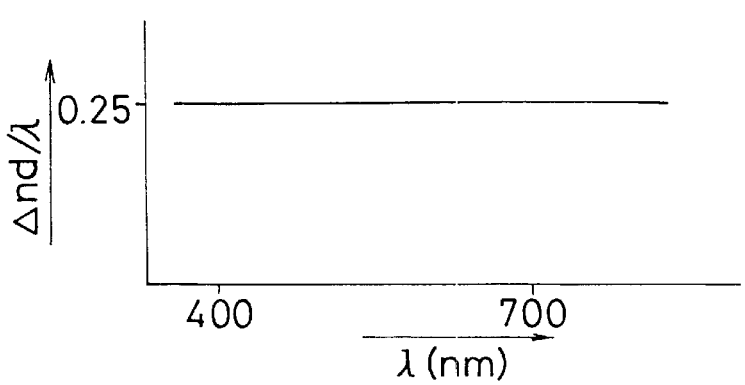

As another embodiment, using the light shielding state of $(\Delta n_1 d_1 - \Delta n_2 d_2)/\lambda = 0.25$ in the case of $\phi=45°$ in the preceding embodiment, by using a phase difference plate having a wavelength dispersion larger than the wavelength dispersion of the liquid crystal, the formula (4) may be satisfied in almost all wavelengths from 400 to 700 nm. That is, as shown in FIG. 9 (a), in the light shielding state when voltage $V_1(V_1 \geq 0)$ is applied, and in the light transmitting state when voltage $V_2(V_2>V_1)$ is applied, when the magnitude $(\Delta n\lambda)_F = (\Delta n_{400} - \Delta n_{700})/\Delta n_{550}$ of the wavelength dispersion of the substrate possessing the optical phase compensating function, and the magnitude $(\Delta n\lambda)_{LC}=(\Delta n_{400}-\Delta n_{700})/\Delta n_{550}$ of the wavelength dispersion of the liquid crystal cell satisfy the condition of $(\Delta n\lambda)_F>(\Delta n\lambda)_{LC}$ (FIG. 10 (b)), if $\Delta n_1 d_1 < \Delta n_2 d_2$ in the light shielding state (FIG. 10 (b). (c)), and when satisfying $(\Delta n\lambda)_F<(\Delta n\lambda)_{LC}$ (FIG. 10 (c)), if in the light shielding state (FIG. 10 (a)), the retardation combining the liquid crystal layer and phase difference plate can satisfy the formula (4) in a wider range of wavelength regions (FIG. 10 (d)).

Similarly, in the light transmitting state when voltage $V_1(V_1 \geq 0)$ is applied and in the light shielding state when voltage $V_2(V_2>V_1)$ is applied, the formula (4) may be satisfied in a wider range of wavelength regions by satisfying $(\Delta n\lambda)_F>(\Delta n\lambda)_{LC}$ if $\Delta n_1 d_1 > \Delta n_2 d_2$ in the light shielding state and $(\Delta n\lambda)_F<(\Delta n\lambda)_{LC}$ if $\Delta n_1 d_1 < \Delta n_2 d_2$.

Figure 11:
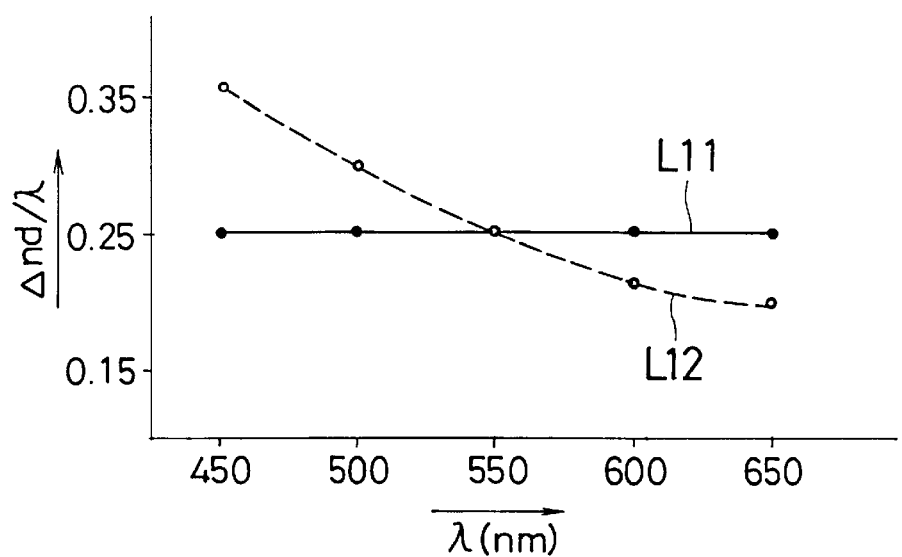
FIG. 11 is a diagram showing the characteristics of $\Delta nd/\lambda$ when using the phase difference plate of the invention and when using a conventional phase difference plate.

FIG. 11 shows the result of measuring the value of $|\Delta n_1 d_1 - \Delta n_2 d_2|/\lambda$ at each wavelength when using such phase difference plate. Line L11 shows the characteristics of the phase difference plate of the invention, and line L12 represents the conventional phase difference plate. As is clear from the diagram, by using the phase difference plate of the invention, the condition formula can be satisfied in almost all wavelengths from 400 to 700 nm.

Figure 12:
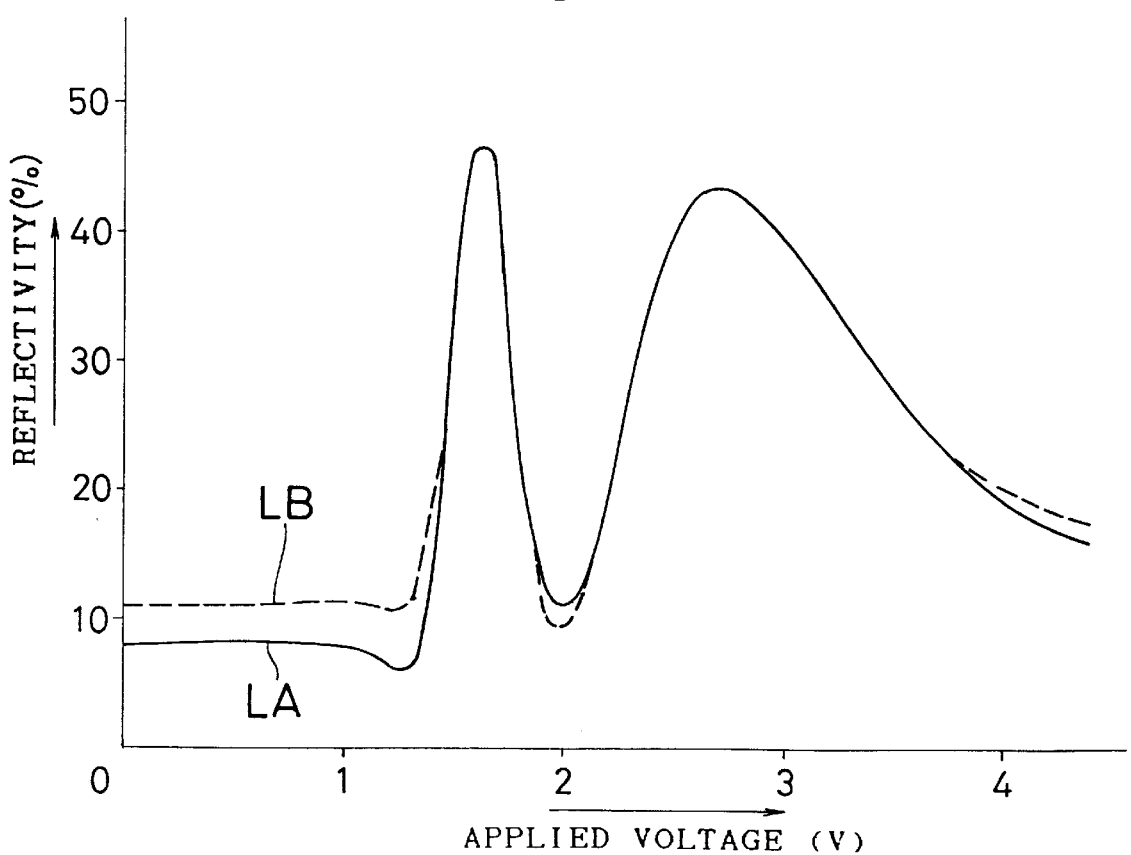
FIG. 12 is a diagram showing the voltage dependence of reflectivity of a reflective type liquid crystal display device in another different embodiment.

FIG. 12 shows the voltage-reflectivity characteristics LA by using a phase difference plate having a larger wavelength dispersion than the wavelength dispersion of the liquid crystal, and the voltage-reflectivity characteristics LB by using a conventional phase difference plate having a smaller wavelength dispersion than the wavelength dispersion of the liquid crystal. In this case, the measuring method is same as in the preceding embodiment.

As is evident from FIG. 12, when the phase difference plate having a larger wavelength dispersion than the liquid crystal layer is used, the condition of the light shielding state can be satisfied in a wider range of the wavelength region, and the reflectivity of the light shielding state is lowered, so that a favorable display performance without parallax at the contrast ratio of 8 is exhibited.

That is, when the wavelength dispersion, whose retardation in the light shielding state is smaller, is set larger than the other wavelength dispersion, it is possible to realize the desired light shielding state in a wider range of wavelengths, so that the display characteristics may be enhanced.

In the embodiment, parallel orientation is used in the liquid crystal layer, but it is not limitative, and the liquid crystal layer of any orientation can be applied as far as the retardation can be controlled by the electric field.

As the optical phase compensator, any liquid crystal layer capable of optimally setting the retardation can be used.

The invention is not limited to the foregoing embodiments alone, but may be widely applied in reflective type optical control devices.

Moreover, by forming a color filter layer on one substrate, multi-color or full-color display may be also realized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflective type liquid crystal display device comprising:

a first light-transmittable insulating substrate, including at least one transparent electrode;

a second insulating substrate;

a reflector formed on the second insulating substrate, the reflector forming at least one second electrode for display driving in connection with the at least one transparent electrode;

a liquid crystal layer sealed between the first light-transmittable substrate and the reflector, the liquid crystal layer including nematic liquid crystal molecules;

an optical phase compensating member disposed on the first light-transmittable substrate; and a polarizer at a light incident side, disposed on the optical phase compensating member, wherein the director direction of the liquid crystal molecules of the liquid crystal layer is almost orthogonal to a slow direction of the optical phase compensating member, and further wherein a light transmission state is selected when a retardation $\Delta n_1 d_1$, wherein $\Delta n_1$ is an optical anisotropy of the liquid crystal layer and d1 is a thickness of the liquid crystal layer, and a retardation $\Delta n_2 d_2$, wherein $\Delta n_2$ is an optical anisotropy of the optical phase compensating member and $d_2$ is a thickness of the optical phase compensating member, are in a relation of $$|\Delta n_1 d_1 - \Delta n_2 d_2|/\lambda = m/2 \pm 0.1, \tag{1}$$

wherein m is an integer and $\lambda$ is a wavelength in a range of 400 to 700 nm, upon application of a voltage $V_1(V_1 \geq 0)$ and a light shielding state is selected when the retardation of the liquid crystal cell and the optical phase compensating member are in a relation of $$|\Delta n_1 d_1 - \Delta n_2 d_2|/\lambda = 0.25 + m/2 \pm 0.1, \qquad (2)$$

upon application of a voltage $V_2(V_2>V_1)$, wherein a numerical value of $|\Delta n_1 d_1 - \Delta n_2 d_2|$ is varied depending on an electric field applied to the liquid crystal layer, and still further wherein the relation $(\Delta n\lambda)F>(\Delta n\lambda)Lc$ is satisfied when $\Delta n_1 d_1 > \Delta n_2 d_2$ is met in the light shielding state, wherein $(\Delta n\lambda)F$ is a magnitude of wavelength dispersion of the optical compensating member and $(\Delta n\lambda)Lc$ is a magnitude of wavelength dispersion of the liquid crystal layer, and the relation $(\Delta n\lambda)F<(\Delta n\lambda)Lc$ is satisfied when $\Delta n_1 d_1 < \Delta n_2 d_2$ is met in the light shielding state.

2. The reflective type liquid crystal display device of claim 1, wherein one of an absorption axis and a transmission axis of the polarizer is set in a range of 30° to 60° to the director direction of the liquid crystal molecules of the liquid crystal layer.

3. The reflective type liquid crystal display device of claim 1, wherein the reflector is mirror finished.

4. The reflective type liquid crystal display device of claim 1, wherein a color filter layer is formed on one of the first light-transmittable insulating substrate and at least one transparent electrode.

5. The reflective type liquid crystal display device of claim 1, wherein the reflector includes a layer with undulations formed thereon.

6. A reflective type liquid crystal display device comprising:
   a first light-transmittable substrate, including at least one transparent electrode;
   a second insulating substrate;
   a reflector formed on the second insulating substrate, the reflector forming at least one second electrode for display driving in connection with the at least one transparent electrode;
   a liquid crystal layer sealed between the first light-transmittable substrate and the reflector, the liquid crystal layer including nematic liquid crystal molecules;
   an optical phase compensating member disposed on the first light-transmittable substrate; and
   a polarizer at a light incident side, disposed on the optical phase compensating member,
   wherein the director direction of the liquid crystal molecules of the liquid crystal layer is almost orthogonal to a slow direction of the optical phase compensating member,
   and further wherein a light shielding state is selected when a retardation $\Delta n_1 d_1$, where $\Delta n_1$ is an optical anisotropy of the liquid crystal layer and $d_1$ is a thickness of the liquid crystal layer, and a retardation $\Delta n_2 d_2$, where $\Delta n_2$ is an optical anisotropy of the optical phase compensating member and $d_2$ is a thickness of the optical phase compensating member, are in a relation of $$|\Delta n_1 d_1 - \Delta n_2 d_2|/\lambda = 0.25 + m/2 \pm 0.1, \qquad (2)$$

wherein m is an integer and $\gamma$ is a wavelength in a range of 400 to 700 nm, upon application of a voltage $V_1(V_1 \geq 0)$ and a light transmission state is selected when the retardation of the liquid crystal cell and the optical phase compensating member are in a relation of $$|\Delta n_1 d_1 - \Delta n_2 d_2|/\lambda = m/2 \pm 0.1, \qquad (1)$$

upon application of a voltage $V_2(V_2>V_1)$, wherein a numerical value of $|\Delta n_1 d_1 - \Delta n_2 d_2|$ is varied depending on an electric field applied to the liquid crystal layer and still further wherein the relation $(\Delta n\lambda)F>(\Delta n\lambda)Lc$ is satisfied when $\Delta n_1 d_1 > \Delta n_2 d_2$ is met in the light shielding state, wherein $(\Delta n\lambda)F$ is a magnitude of wavelength dispersion of the optical compensating member and $(\Delta n\lambda)Lc$ is a magnitude of wavelength dispersion of the liquid crystal layer, and the relation $(\Delta n\lambda)F<(\Delta n\lambda)Lc$ is satisfied when $\Delta n_1 d_1 < \Delta n_2 d_2$ is met in the light shielding state.

7. The reflective type liquid crystal display device of claim 6, wherein one of an absorption axis and a transmission axis of the polarizer is set in a range of 30° to 60° to the director direction of the liquid crystal molecules of the liquid crystal layer.

8. The reflective type liquid crystal display device of claim 6, wherein the reflector is mirror finished.

9. The reflective type liquid crystal display device of claim 6, wherein a color filter layer is formed on one of the first light-transmittable insulating substrate and at least one transparent electrode.

10. The reflective type liquid crystal display device of claim 6, wherein the reflector includes a layer with undulations formed thereon.

\* \* \* \* \*